(12) United States Patent
Koneczny

(10) Patent No.: US 8,789,855 B2
(45) Date of Patent: Jul. 29, 2014

(54) LOCKING MECHANISM FOR AN AIRCRAFT DOOR AND METHOD FOR THE LOCKING OF AN AIRCRAFT DOOR

(75) Inventor: Manfred Koneczny, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 637 days.

(21) Appl. No.: 13/076,601

(22) Filed: Mar. 31, 2011

(65) Prior Publication Data

US 2011/0248514 A1   Oct. 13, 2011

Related U.S. Application Data

(60) Provisional application No. 61/320,356, filed on Apr. 2, 2010.

(30) Foreign Application Priority Data

Apr. 2, 2010   (DE) .................. 10 2010 013 715

(51) Int. Cl.
*E05C 5/04*   (2006.01)

(52) U.S. Cl.
USPC .............................. 292/58; 292/201; 292/216

(58) Field of Classification Search
USPC ....................................... 292/58, 201, 216, 1
See application file for complete search history.

(56) References Cited

U.S. PATENT DOCUMENTS

| 3,638,983 | A | * | 2/1972 | Flournoy et al. | ............... 292/302 |
| 4,720,065 | A | | 1/1988 | Hamatani | |
| 5,305,969 | A | * | 4/1994 | Odell et al. | ................ 244/129.5 |

FOREIGN PATENT DOCUMENTS

| DE | 4121247 A1 | * | 1/1993 |
| RU | 1468052 A1 | * | 1/1997 |

* cited by examiner

*Primary Examiner* — Mark Williams
(74) *Attorney, Agent, or Firm* — Leydig, Voit & Mayer, Ltd.

(57) ABSTRACT

A locking mechanism for an aircraft door includes a plurality of frame-side fittings and a plurality of door-side fittings. Each frame-side fitting includes a pin with an eccentric rotary cylinder mounted on each pin. Each door-side fitting includes an eccentric rotary latch configured to encompass at least a section of a corresponding rotary cylinder. Also a method of locking a door using the locking mechanism.

10 Claims, 5 Drawing Sheets

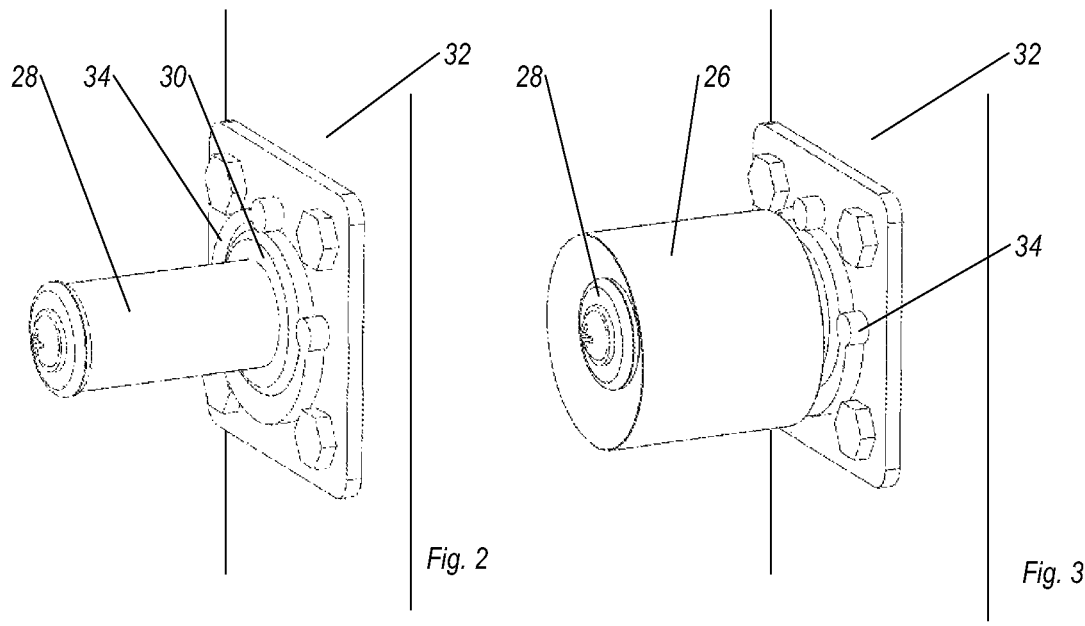
Fig. 2
Fig. 3
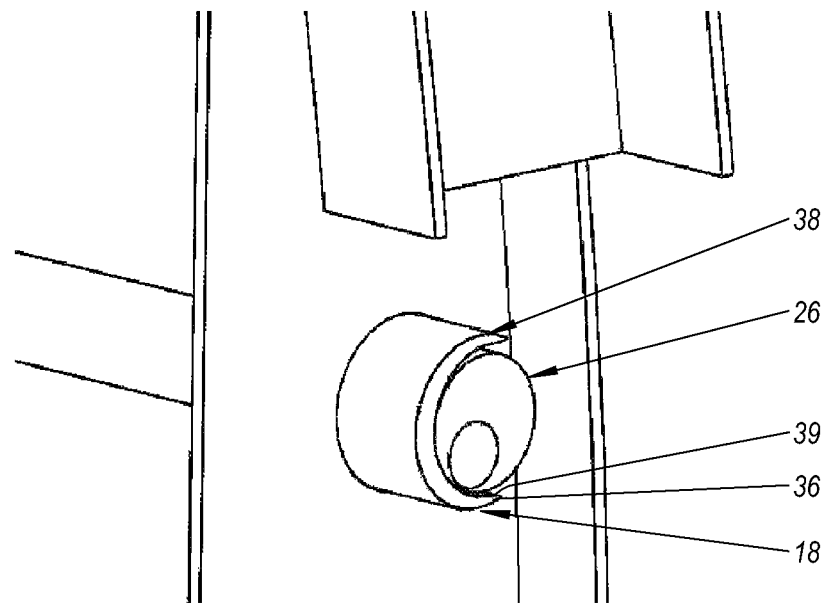
Fig. 4

LOCKING MECHANISM FOR AN AIRCRAFT DOOR AND METHOD FOR THE LOCKING OF AN AIRCRAFT DOOR

CROSS REFERENCE TO RELATED APPLICATIONS

This application claims priority to German Patent Application No. 10 2010 013 715.4, filed Apr. 2, 2010 and U.S. Provisional Patent Application No. 61/320,356, filed Apr. 2, 2010, both of which are hereby incorporated by reference herein in their entireties.

FIELD

The present invention concerns a locking mechanism for an aircraft door, in particular an aeroplane door and also a method for the locking of an aircraft door of this type.

BACKGROUND

Doors in aircraft must on the one hand be able to be closed tightly and must be able to accommodate securely all loads that occur, and on the other hand must be quick and easy to open in an emergency. There are essentially two principles in accordance with which, for example, locking mechanisms for aeroplane doors can be designed.

A door designed in accordance with the so-called abutment principle has abutment fittings on its lateral edges, which in the closed position of the door abut against corresponding fuselage-side fittings such that a form fit is formed between the door and the fuselage, via which the internal forces acting on the door are transferred to the fuselage structure. A door of this type is e.g. shown in the patent document U.S. Pat. No. 4,720,065 and must be lowered for purposes of closing and raised for purposes of opening, in order to release the abutment fittings for an opening movement that is directed outwards.

A door designed in accordance with the so-called toggle principle has on its lateral edges toggles that can rotate; as the door pivots inwards these stand parallel to the pivoting movement and engage in fuselage-side holding fixtures. For purposes of closing the door the toggles are set transverse within the holding fixtures, so that here too a form fit is achieved.

However, what is disadvantageous for both principles is the high level of complexity of the kinematic system required, since a large number of shafts, bearings, levers, linkages, crank drives and similar are necessary.

Moreover, there are aeroplane doors that are designed in accordance with both the abutment principle and the toggle principle. The combination of the two principles leads, however, less to a reduction of complexity than to an increase of the same, and thus, in addition to an increase in weight, to relatively high manufacturing costs.

SUMMARY

An aspect of the present invention is to provide a locking mechanism for an aircraft door, in particular an aeroplane door, which removes the above-cited disadvantages and with a reduced level of complexity enables a secure locking procedure as well as an opening procedure for emergency situations, and also a method for the locking of an aircraft door.

In an embodiment, the present invention provides a locking mechanism for an aircraft door including a plurality of frame-side fittings and a plurality of door-side fittings. Each frame-side fitting includes a pin with an eccentric rotary cylinder mounted on each pin. Each door-side fitting includes an eccentric rotary latch configured to encompass at least a section of a corresponding rotary cylinder.

BRIEF DESCRIPTION OF THE DRAWINGS

Exemplary embodiments of the present invention are described in more detail with reference to schematic representations shown in the drawings, in which:

FIGS. 2 and 3 show a rotary cylinder of the locking mechanism from FIG. 1, FIGS. 4 and 5 show a rotary latch of the locking mechanism from FIG. 1, FIGS. 6 and 7 show sketches to illustrate an eccentricity of the rotary cylinders and the rotary latches in accordance with an embodiment of the invention.

DETAILED DESCRIPTION

Figure 1:
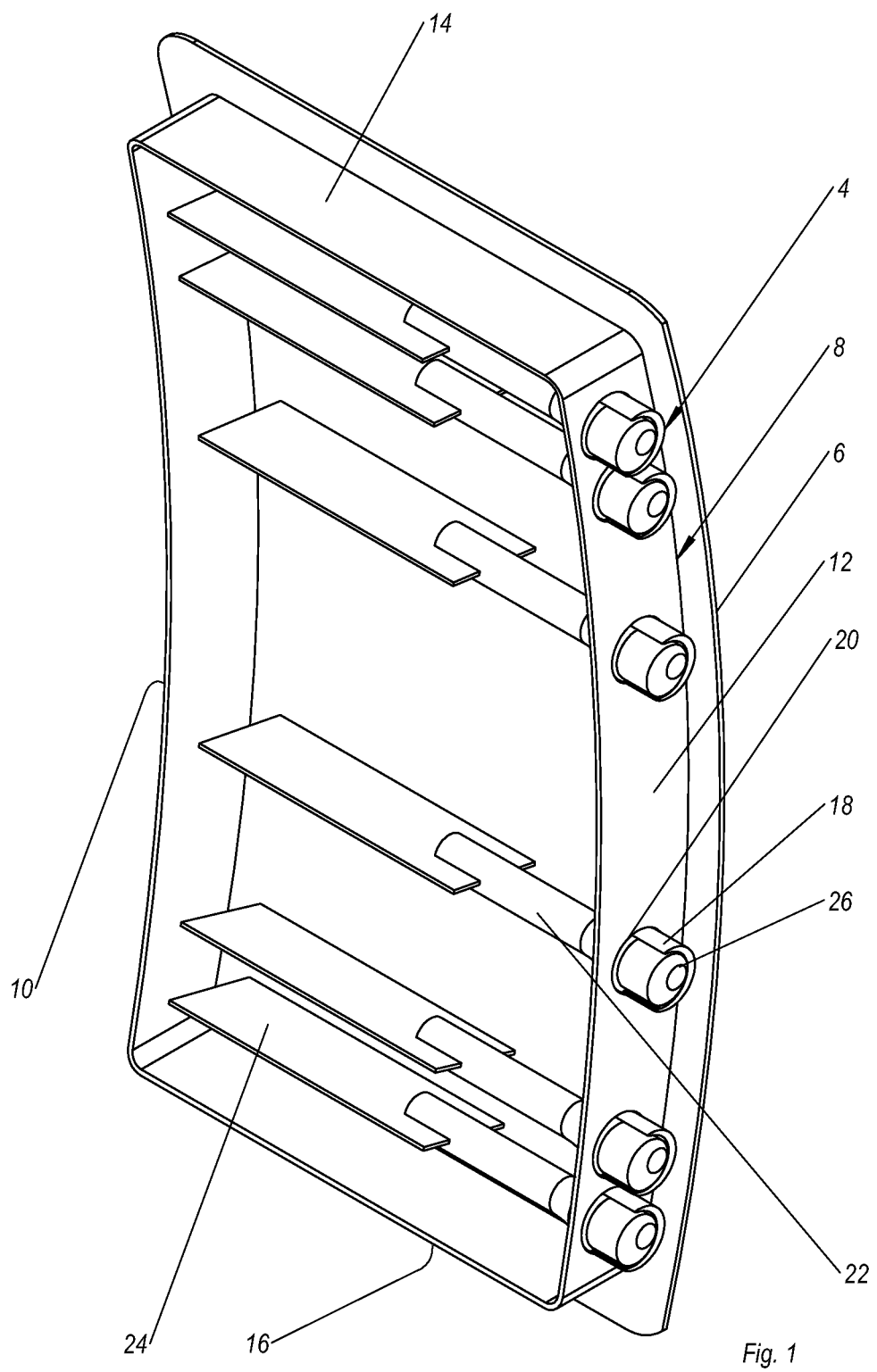
FIG. 1 shows a perspective internal view of an aeroplane door with a locking mechanism in accordance with an embodiment of the invention.

A locking mechanism of an aircraft door in accordance with an embodiment of the invention has a multiplicity of frame-side and door-side fittings. The frame-side fitting have pins, on which an eccentric rotary cylinder is mounted in each case. In accordance with the invention the door-side fittings are designed as eccentric rotary latches for purposes of encompassing sections of the rotary cylinders. The locking mechanism in accordance with the invention is distinguished in particular by a kinematic system that is reduced in its complexity, and thus simplified, since no movement of the door in the vertical direction is necessary for opening or closing purposes. By this means a multiplicity of levers, shafts and other mechanical actuation elements can be dispensed with, as a result of which the locking mechanism is moreover optimized in terms of weight. The lack of a rise or fall movement in the vertical direction makes possible a smaller fuselage-side door aperture compared with conventional solutions, as a result of which the stability of the fuselage is significantly increased. Moreover, relatively narrow lateral gaps between the door and the door frame are possible. Furthermore, by virtue of the lack of a rise or fall movement of the door a simplified sealing concept is possible. Furthermore, the locking mechanism in accordance with embodiments of the invention enables a quasi-floating mounting of the door in its fuselage-side door frame, so that no twisting of the fuselage is introduced into the door, as a result of which both the door itself, the connection of the door frame to the fuselage, and also the door frame per se, can be embodied in a load-optimized manner. In other words, compared with the previous toggle principle, thrust loads resulting from the door frame displacements that already arise under normal flight conditions into the door structure can be avoided.

In one embodiment the rotary latches are in each case designed as radially-extended head sections of a rotary bar, which protrude laterally from the aircraft door. By this means in the particularly heavily loaded upper and lower door regions it is possible to space the individual rotary latches closer together than in a less heavily loaded intermediate region of the door.

The locking mechanism can be particularly easily embodied if both the rotary latches and also the rotary cylinders have a uniform design. This makes it possible that for locking or opening purposes all rotary latches can essentially be rotated through the same angle of rotation, which allows the use of a central kinematic system, i.e. a simplified actuation mechanism. Here the locking mechanism can be actuated manually with a hand lever, or can be electrically actuated via servomotors.

To ensure that when closing the door the rotary cylinders are located in a defined initial position, it is advantageous if they are pre-loaded by a spring into their initial or neutral position.

Opening of the door without any actuation of the locking mechanism can be achieved in that the rotary latches can be retracted into the aircraft door such that the form fit between the rotary cylinders and the rotary latches can be released without any rotation of the rotary latches in the opening direction.

In a method in accordance with an embodiment of the invention for the locking of an aircraft door with a locking mechanism of this type the door is initially pivoted into the fuselage-side door frame. The locking mechanism is then actuated such that the rotary latches encompass sections of the rotary cylinders and after rotation of the rotary latches through an angle of rotation, the rotary latches and the rotary cylinders are mutually locked. In this method it is particularly advantageous that the door does not have to be moved in the vertical direction, either for purposes of locking, or for purposes of opening. In accordance with an embodiment of the invention the door is exclusively opened and closed via a pivotal movement about a vertical axis.

In one example of embodiment the aircraft door is already securely and reliably locked from an angle of rotation of some 100°.

In the figures the same design elements bear the same reference numbers, wherein where there is a plurality of the same design elements just one element can be provided with a reference number in the interests of clarity.

FIG. 1 shows an aeroplane door 2, which is fitted with a locking mechanism 4 for opening, closing and locking purposes. The aeroplane door 2 has an outer skin 6, an inner skin that is not represented, and also an interior structure 8 arranged between the outer skin 6 and the inner skin for purposes of stabilizing the aeroplane door 2. The interior structure 8 has two lateral vertical frame elements, 10, 12, which are spaced apart from one another, via in each case an upper and a lower frame element 14, 16, extending in the longitudinal direction of the aeroplane, i.e. horizontally.

The locking mechanism 4 has a multiplicity of rotary latches 18, which protrude from the lateral frame elements, 10, 12, and in each case form a head section of a rotary bar 22 that is guided in a hole 20 of the frame elements, 10, 12. In the interests of clarity the rotary latches 18 are only shown in the right-hand vertical frame element 12 in accordance with the representation 1. The rotary bars 22 run in the longitudinal direction of the aircraft and can be pivoted through an angle of rotation a by means of a kinematic system or an actuation mechanism 24 that is not described in any further detail. The actuation mechanism 24 can be activated manually or electrically via servomotors. The rotary bars 22 run parallel to one another, wherein in the edge region, i.e. in the region of the horizontal frame elements 14, 16, the rotary bars 22 and thus the rotary latches 18 are spaced closer together than in the intermediate region.

On the fuselage-side, or door frame-side, the locking mechanism 4 has a multiplicity of rotary cylinders 26, sections of which are in each case encompassed by one of the rotary latches 18 during the locking procedure. As shown in FIGS. 2 and 3, each of the rotary cylinders 26 is mounted eccentrically on a pin 28, which via its foot section 30 is securely attached to the door frame 32. For purposes of transferring the rotary cylinders 26 into their neutral or initial position a rotary spring 34 is arranged in the region of the foot section 30 in each case, which is actively engaged with the rotary cylinder 26.

Figure 5:
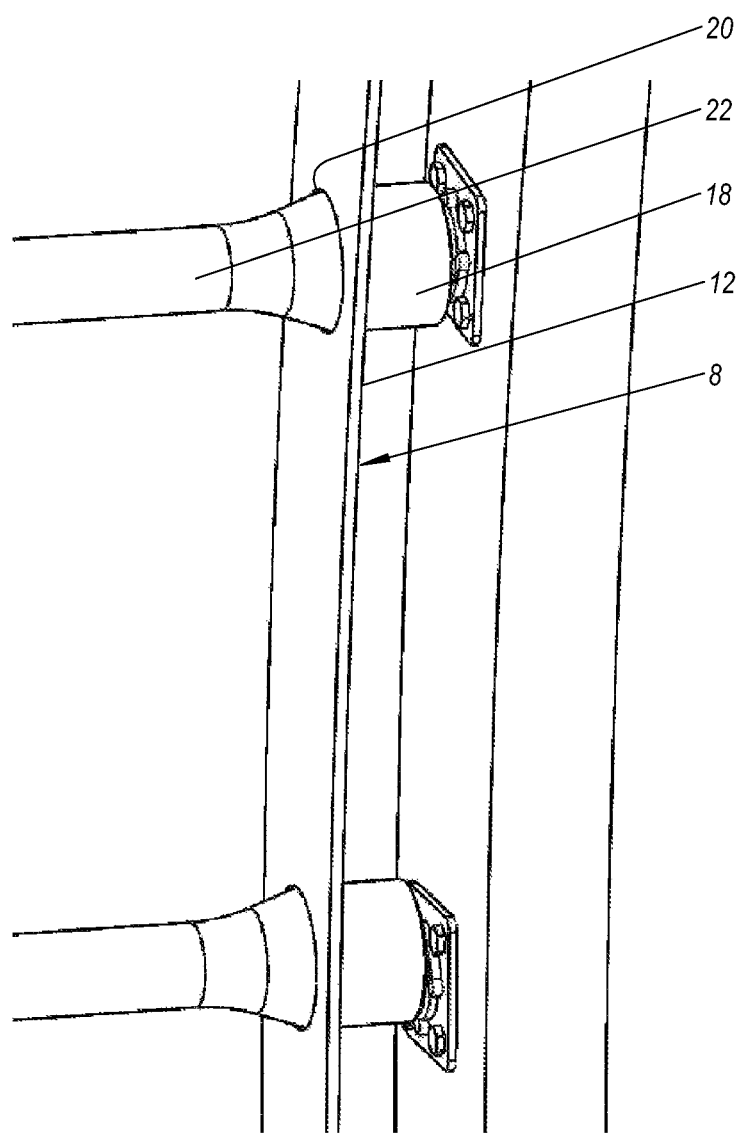

As shown in FIG. 4, the rotary latches 18 are in each case designed as a sickle-shaped claw 36, which defines an eccentric holding fixture 38 with a peripheral opening 39 for purposes of encompassing a section of the rotary cylinders 26. As per FIG. 5, the rotary latches 18 are essentially designed as radial extensions of the rotary bars 22. In order to enable an emergency opening of the aeroplane door 2 without an actuation of the locking mechanism 4, the rotary bars 22 in the region of the radial extensions, i.e. the rotary latches 18, are guided in the holes 20 of the vertical frame elements, 10, 12. By this means it is possible to retract the rotary latches 18 into the interior structure 8 between the lateral frame elements, 10, 12, and thus to extract them from the rotary cylinders 26 in the longitudinal direction, and thereby release the form fit between the rotary latches 18 and the rotary cylinders 26.

Figure 6:
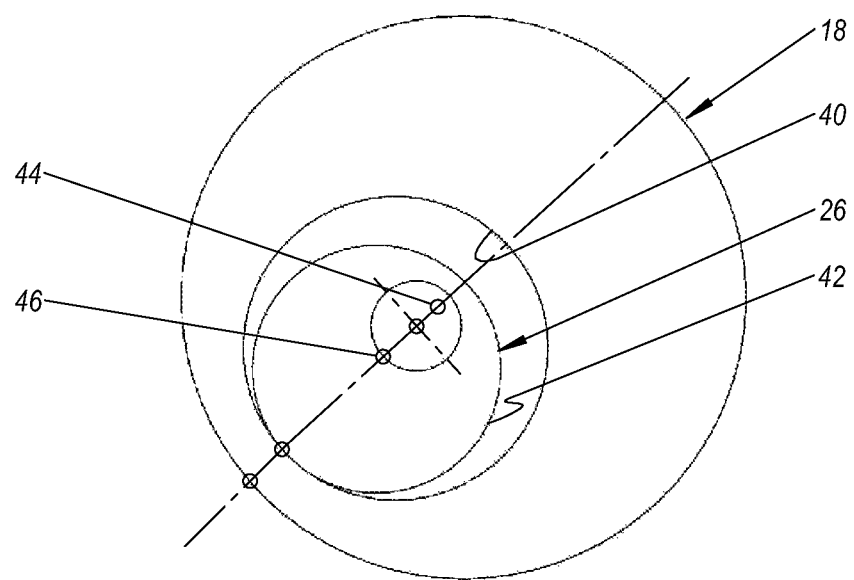
Figure 7:
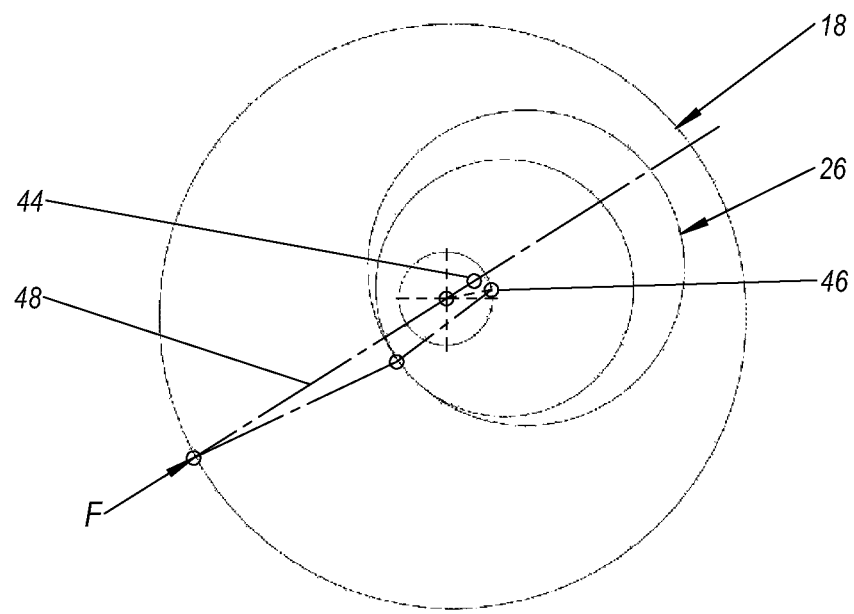

As already stated above, and as can be discerned in particular from FIGS. 6 and 7, the holding fixtures 38 of the rotary latches 18, and also the rotary cylinders 26 are eccentrically embodied, i.e. mounted. During the locking procedure the rotary latches 18 run with their inner periphery 40 onto the outer periphery 42 of the rotary cylinders 26 and drive the latter, wherein the point of rotation 44 of the rotary latches and the point of rotation 46 of the rotary cylinders 26 are in each case arranged relative to one another such that in the locking position shown in FIG. 7 with a pressure load on the aeroplane door 2, for example as a result of internal cabin pressure, a moment is introduced via a force F into the locking mechanism 4, via which the rotary cylinders 26 are always pushed or transferred into the locking position, so that even in the unlikely event that the aeroplane door 2 has not been closed correctly, any inadvertent opening of the aeroplane door 2 is prevented (see forces polygon 48). In this manner the aeroplane door 2 has a quasi-automated locking process.

Figure 10:
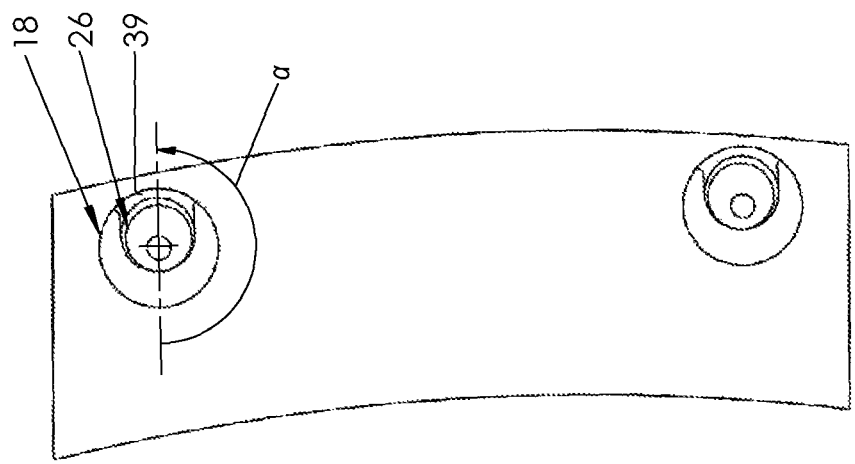
FIGS. 8 to 10 show steps in the method for the locking of the aeroplane door in accordance with an embodiment of the invention.
Figure 9:
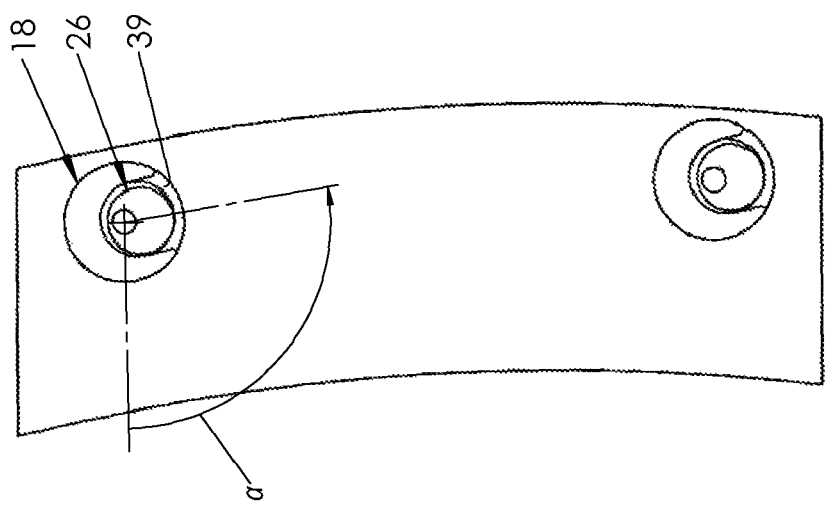
Figure 8:
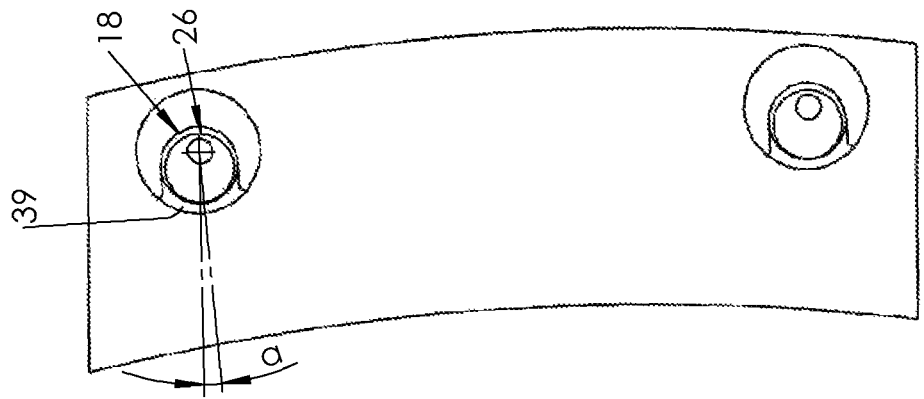

In what follows steps of a method in accordance with an embodiment of the invention for the locking of an aeroplane door 2 with the locking mechanism 4 are elucidated with the aid of FIGS. 8, 9 and 10. The aeroplane door 2 is open and via a pivotal movement about a vertical axis is moved in the horizontal direction in the direction of the door frame 32. The rotary latches 18 point with their lateral openings 39 in the pivotal direction, and are located in the initial position, in which their angle of rotation $\alpha=0°$. The rotary cylinders 26 are located in their neutral position that is pre-loaded by a spring. As soon as the aeroplane door 2 is closed, as shown in FIG. 8, and the rotary cylinders 26 are accommodated in the holding fixtures 38 of the rotary latches 18, the rotary latches are rotated via the actuation mechanism such that with their inner periphery 40 they run onto the outer periphery 42 of the rotary cylinders 26. As a result of the eccentricity of the rotary latches 18 and the rotary cylinders 26, the rotary latches 18 drive the rotary cylinders 26, so that these also execute a rotation. After a rotation of the rotary latches 18 through about 100°, as per FIG. 9, the aeroplane door 2 is basically locked in the door frame 32. The rotary latches 18 are rotated further until, as shown in FIG. 10, they are pivoted through an approximate angle of rotation $\alpha=180°$. In this position the aeroplane door 2 is securely locked; however, in the event of an emergency it can be opened via a retraction of the rotary bars 22 in the longitudinal direction without any rotation of the rotary latches 18.

For the regular opening of the aeroplane door 2 the rotary latches 18 are rotated in the opposite direction, such that the rotary latches 18 are moved back into their respective initial positions, and thereby release the rotary cylinders 26 that rotate with them. After the rotary cylinders 26 have been once again released the aeroplane door 2 is opened by means of a horizontal pivotal movement about the vertical axis in the opposite direction.

Disclosed is a locking mechanism for an aircraft door with a multiplicity of frame-side and door-side fittings, wherein the frame-side fittings have pins, on which in each case an eccentric rotary cylinder is mounted, and wherein the door-side fittings are designed as eccentric rotary latches to encompass sections of the rotary cylinders; also disclosed is a method for the closing and opening of an aircraft door without any rise and fall movement of the same.

LIST OF REFERENCE SYMBOLS

2 Aeroplane door
4 Locking mechanism
6 Outer skin
8 Interior structure
10 Vertical frame element
12 Vertical frame element
14 Horizontal frame element
16 Horizontal frame element
18 Rotary latch
20 Hole
22 Rotary bar
24 Kinematic system
26 Rotary cylinder
28 Pin
30 Foot section
32 Door frame
34 Rotary spring
36 Sickle-shaped claw
38 Eccentric holding fixture
39 Opening
40 Inner periphery
42 Outer periphery
44 Point of rotation for the rotary latch
46 Point of rotation for the rotary cylinder
48 Forces polygon
F Force
αAngle of rotation

What is claimed is:

1. A locking mechanism for an aircraft door, the locking mechanism comprising:
   a plurality of frame-side fittings, each frame-side fitting including a pin;
   an eccentric rotary cylinder mounted on each pin the rotary cylinder having an outer periphery; and
   a plurality of door-side fittings, each door-side fitting including an eccentric rotary latch having an inner periphery, the rotary latch being configured to encompass at least a section of a corresponding rotary cylinder, and being configured to run with its inner periphery onto the outer periphery of the rotary cylinder through a rotary movement and to drive the rotary cylinder to execute a rotation, such that a moment is introduced into the locking mechanism, through which the rotary cylinder is continuously pushed into the locking position.

2. The locking mechanism recited in claim 1, wherein each rotary latch is configured as a radially extended head section of a rotary bar extending laterally from the aircraft door.

3. The locking mechanism recited in claim 1, wherein each rotary latch is configured to rotate through a same angle of rotation so as to lock the aircraft door.

4. The locking mechanism recited in claim 3, further comprising servomotors configured to electrically actuate the rotary latches.

5. The locking mechanism recited in claim 1, wherein each rotary latch is configured to retract into the aircraft door.

6. The locking mechanism recited in claim 1, wherein the rotary latches have a uniform design and wherein the rotary cylinders have a uniform design.

7. The locking mechanism recited in claim 1, wherein the rotary cylinders are pre-loaded by a sprint into a neutral position.

8. The locking mechanism recited in claim 1, wherein corresponding latch and cylinder pairs of the rotary latches and rotary cylinders are disposed in the upper, intermediate and lower regions of a frame of the aircraft door, and wherein the latch and cylinder pairs in the upper and lower regions are disposed closer to adjacent latch and cylinder pairs than the latch and cylinder pairs in the intermediate region.

9. A method of locking an aircraft door using a locking mechanism, the method comprising:
   providing a locking mechanism on the aircraft door, the locking mechanism including:
   a plurality of frame-side fittings, each frame-side fitting including a pin,
   an eccentric rotary cylinder mounted on each pin, the rotary cylinder having an outer periphery, and
   a plurality of door-side fittings, each door-side fitting including an eccentric rotary latch having an inner periphery, the rotary latch being configured to encompass at least a section of a corresponding rotary cylinder and being configured to run with its inner periphery onto the outer periphery of the rotary cylinder, through a rotary movement and to drive the rotary cylinder to execute a rotation,
   pivoting an aircraft door into a fuselage-side door frame;
   positioning the locking mechanism such that each rotary latch encompasses a section of a corresponding rotary cylinder; and
   actuating the locking mechanism so as to mutually lock the rotary latches and rotary cylinders by rotating the rotary latches through an angle of rotation, such that a moment is introduced into the locking mechanism, through which the rotary cylinder is continuously pushed into the locking position.

10. The method recited in claim 9, wherein the angle of rotation of the rotary latches during the actuating of the lock is at least 100°.

* * * * *